(12) United States Patent
Hottle et al.

(10) Patent No.: US 6,210,601 B1
(45) Date of Patent: Apr. 3, 2001

(54) METHOD OF MAKING AN OXYGEN SCAVENGING SEALANT COMPOSITION

(76) Inventors: Larry A. Hottle, 224 E. Elm St., Granville, OH (US) 43023; Graham Ryall, 124 Oakfield Road, Carterton, Oxfordshire OX18 3QW (GB)

(*) Notice: Subject to any disclaimer, the term of this patent is extended or adjusted under 35 U.S.C. 154(b) by 0 days.

(21) Appl. No.: 09/295,451

(22) Filed: Apr. 21, 1999

(51) Int. Cl.[7] .................. C09K 15/06; C09K 15/12; C08K 3/30
(52) U.S. Cl. .................. 252/188.28; 252/188.21
(58) Field of Search ................. 252/188.28, 188.2, 252/188.21

(56) References Cited

U.S. PATENT DOCUMENTS

| | | | |
|---|---|---|---|
| 4,147,853 | * | 4/1979 | Goswami et al. . |
| 4,279,350 | * | 7/1981 | King . |
| 4,510,162 | * | 4/1985 | Nezat . |
| 4,756,436 | * | 7/1988 | Morita et al. . |
| 5,075,362 | * | 12/1991 | Hofeldt et al. . |
| 5,106,886 | * | 4/1992 | Hofeldt et al. . |
| 5,151,476 | * | 9/1992 | Marshall et al. . |
| 5,202,052 | * | 4/1993 | Zenner et al. . |
| 5,204,389 | * | 4/1993 | Hofeldt et al. . |
| 5,227,411 | * | 7/1993 | Hofeldt et al. . |
| 5,364,555 | * | 11/1994 | Zenner et al. . |
| 5,492,742 | * | 2/1996 | Zenner et al. . |
| 5,652,088 | * | 7/1997 | Yamashita . |
| 5,780,209 | * | 7/1998 | Yamashita . |
| 5,977,212 | * | 11/1999 | Egner et al. ............. 523/210 |

* cited by examiner

*Primary Examiner*—Joseph D. Anthony
(74) *Attorney, Agent, or Firm*—Burns, Doane, Swecker & Mathis, L.L.P.

(57) ABSTRACT

A method for compounding an oxygen scavenging sealant composition is provided. The method includes compounding a gasket formulation with an oxygen scavenging material of reduced particle size. The sealants of the present invention provide a more effective and longer lived hermetic seal.

13 Claims, No Drawings

METHOD OF MAKING AN OXYGEN SCAVENGING SEALANT COMPOSITION

BACKGROUND OF THE INVENTION

1. Field of the Invention

The present invention relates to a method of making an oxygen scavenging sealant composition that can be utilized to improve the shelf life of packaged materials, such as oxygen sensitive foods. As used herein, the term sealant is as known to those skilled in the art for forming an hermetic seal with a packaging container. It includes, for example, gaskets (bonded) and liners (non-bonded).

2. Description of Related Art

In packaging oxygen sensitive materials such as food, beverages and pharmaceuticals (collectively "foodstuffs") oxygen contamination can be particularly troublesome. Care is generally taken to minimize the introduction of oxygen, to exclude the oxygen from the package when initially sealed or to otherwise reduce the detrimental or unwanted effects of oxygen on foodstuffs.

It is known to package foodstuffs in containers wherein the walls contain an oxidizable component which reacts with oxygen that is trapped in the package or permeates through the wall of the package. These systems are described, for example, in U.S. Pat. Nos. 4,536,409 and 4,702,966.

When the container wall is formed of a glass or metal body and is provided with a metal closure, oxygen does not permeate through the container walls due to the impermeable materials used to make the container walls or closure. However, it has long been recognized that conventional containers employed for the storage of oxidizable materials may be permeable through the seams at the juncture between glass or metal components, often through sealants used to fill these seams. In addition, oxygen may remain within the container from the closing operation.

To extend the shelf life of foodstuffs while continuing to utilize conventional materials, attempts have been made to incorporate oxygen scavenging systems in the container crown or closure. For example, U.S. Pat. No. 4,279,350 discloses a closure liner which incorporates a catalyst disposed between an oxygen permeable barrier and a water absorbent backing layer.

U.S. Pat. No. 4,510,162 describes an oxygen adsorbent composition containing iron particles, yeast and moisture, which is mounted on a suitable carrier and adapted to be mounted in a closable container for removing oxygen therefrom.

U.S. Pat. Nos. 4,756,436 and 5,106,886 disclose an oxygen scavenging composition to be installed as a gasket between the cap and the container. Particularly, U.S. Pat. No. 5,106,886, discloses a sealant that incorporates a sodium ascorbate oxygen scavenger in a plasticized polyvinyl chloride.

A disadvantage associated with the prior art oxygen scavenging sealant compositions is their inability to maintain a hermetic seal over a prolonged shelf life.

To overcome this disadvantage, it is an object of this invention to provide a method for compounding an oxygen scavenging sealant composition having improved long term sealing ability, thereby preventing the oxidation of the foodstuff and prolonging the shelf-life of the package.

Another object of the invention is to provide a method of compounding an oxygen scavenging sealant composition that has an improved oxygen uptake.

Other objects and aspects of the present invention will become apparent to one skilled in the art on a review of the specification and claims appended hereto.

SUMMARY OF THE INVENTION

According to a first aspect of the invention, a method of making a sealant composition is provided. Oxygen scavenger particles are pre-dispersed in a plasticizer to form a paste. The paste is processed to the point where at least about 99.5 percent by weight of said oxygen scavenger particles are less than 125 microns in size and, preferably less than 76.20 microns, and more preferably less than 50.80 microns. The processed paste is introduced into a plastisol formulation.

According to another aspect of the invention, a method for making a sealant composition is provided. The method includes processing oxygen scavenger particles to the point where at least about 99.5 percent by weight of particles are less than 125 microns in size preferably less than 76.20 microns, and more preferably less than 50.80 microns. The particles are dispersed into a plasticizer and the plasticizer, comprising the processed oxygen scavenger particles, is introduced into a plastisol formulation.

In a further embodiment of the present invention, a method for compounding a sealant composition is provided. The method includes pre-dispersing oxygen scavenger particles in a plasticizer to form a paste and processing said paste to the point where at least about 99.5 percent by weight of said oxygen scavenger particles are less than about 55.88 microns in size. The processed paste is then introduced into a plastisol formulation.

According to yet another aspect of the present invention, a method for making an oxygen scavenging composition for a closure is provided. The method includes pre-dispersing oxygen scavenging particles in a liquid carrier. As herein utilized, the term liquid carrier includes plasticizers or melts. The carrier comprising the dispersed particles therein is milled to the point where substantially all of the particles are less than about 76.20 microns in size and is added to a polymeric matrix to form the composition. As used herein, the term "substantially all" means at least about 99.5 percent by weight.

In another aspect of the invention, a method of making an oxygen-scavenging composition for use in closures is provided. The method includes providing an oxygen scavenging powder wherein all of the particles are less than about 76.20 microns in size, and adding said powder directly or indirectly to a polymeric matrix to form the composition.

DETAILED DESCRIPTION OF THE PREFERRED EMBODIMENTS OF THE INVENTION

The present invention provides a method of forming sealing compositions suitable for fabricating closures or gaskets to effect and maintain a hermetic seal. The compositions provided by the disclosed method improves the lifespan of closure materials and improves their efficiency in oxygen scavenging. The composition of the invention can be formulated in a convenient fluid form, such as a plastisol, melt, organic solution or dispersion. In a plasticizer sealant composition, a liquid plastisol system is utilized.

One embodiment of the present invention involves a sealant composition formed from a plastisol formulation having oxygen scavenging properties necessary to protect oxygen sensitive food. By plastisol formulation, it is herein meant a dispersion of finely divided resin in a plasticizer. A particular application is to hermetically seal a glass container by means of a metal closure wherein the plastisol is utilized as a gasket. As will be appreciated by those skilled in the art, the formed plastisol gasket on a container closure device provides an adhesive agent impervious to outside interference, particularly from oxygen. Additionally, the gasket provides improved uptake of oxygen in the headspace of the package. The term, headspace as used herein, is meant to describe the volume inside the sealed package not occupied by the foodstuff. Further, it should be clear that the inventive concepts described hereinbelow are in no way limited, and can be readily applied to other forms of packaging containers.

In a preferred embodiment, the plastisol includes polyvinyl chloride resin particles dispersed in a liquid plasticizer and an oxygen scavenging agent. Additionally, the composition might contain fillers, pigments, stabilizers, lubricants, chemical blowing agents, activators, and other conventional additives in conventional amounts, depending on the nature and intended application of the composition. Suitable compositions for this invention includes Daraseal 3287 from W.R. Grace; Svelith TOS 350-7 from D S Chemie; and AH-10983, AH-10982, AH-10923 from Crown Cork and Seal Company, Inc.

The polymeric matrix material can be selected with reference to the nature of the composition (e.g., plastisol, solution, or melt). Suitable materials for use when the composition is a plastisol include vinyl chloride homopolymers and copolymers as described in U.S. Pat. No. 5,106,886 (Hofeldt et al.) issued on Apr. 21, 1992, and incorporated by reference herein.

Suitable polymeric materials forming the matrix include, for example, acrylics, silicones, polyurethane rubber, rubber latices (natural or synthetic), styrene- ethylene/butylene-styrene block copolymers, styrene- butadiene-styrene block copolymers, styrene-isoprene- styrene block copolymers, polyesters, epoxy polymers, crosslinked rubber, blends of crosslinked rubber with thermoplastic materials (e.g. EPDM blend with polypropylene), and poly(ethylene-vinyl acetate).

The plastisol compositions of the present invention include plasticizers. Those skilled in the art will recognize the term plasticizer as referring to an organic compound added to a high polymer both to facilitate processing and increase the flexibility and toughness of the final product by internal modification. *Hawley's Condensed Chemical Dictionary*, 13$^{th}$ edn. Suitable plasticizers for the purposes of the invention include: diisononyl phthalate, diisodecyl phthalate, di-2-ethyl hexyl phthalate, butyl benzyl phthalate, di-2-ethyl hexyl adipate, dibutyl adipate, acetyl tributyl citrate, epoxidized soybean oil and epoxidized linseed oil. Lubricants applicable to this invention include oleamide, erucamide, paraffin wax, silicone fluid, N,N'-ethylene bisstearamide, POE sorbitan mono oleate, zinc stearate and calcium stearate. Those skilled in the art will also recognize that other known calcium/zinc stabilizers, and blowing agents such as azodicarbonamide and 4,4'-oxybis (benzenesulfonyl hydrazide) can be employed as well.

A commonly utilized system in the preparation of gaskets involves a liquid plastisol formulation having discrete polyvinyl chloride resin particles dispersed in a liquid plasticizer at ambient temperature (i.e. 20–30° C.). The polyvinyl chloride particles are commercially available and preferred particles typically range from about 0.5 to about 2.0 microns in size. When exposed to elevated temperatures, (desirably about 200 to 215° C.), the plastisol undergoes several stages of gelation and fusion, ultimately becoming a homogeneous rubbery solid with physical properties suitable for a gasket in a metal closure which is designed to maintain a hermetic seal with a container, such as a glass, metal, or plastic bottle or jar.

An important feature of the invention is that the plastisol gasket composition contain an oxygen scavenger of sufficiently small particle size, such that oxidation of the particles in the presence of water will not adversely affect the hermetic seal of the gasket. Moreover, the small particle size reducing agent reacts with gaseous oxygen in an efficient manner to reduce or eliminate the oxygen permeation into the headspace of the sealed package. Oxygen scavengers, such as ascorbates, isoascorbates, and a blend of ascorbates and sulphites as recommended in U.S. Pat. No. 4,536,409 can be employed. Particularly suitable for use in a gasket composition is sodium ascorbate such as the commercially available powder from BASF Corp. sold as powder grade USP, FCC.

By use of this invention, it is possible to greatly improve the oxygen scavenging capabilities of the sealant and prolong the life of the hermetic seal between a container and a closure in which the plastisol formulation is utilized. The method of processing the sodium ascorbate powder prior to its incorporation in the sealant material will be further described in detail with reference to the following examples, which are, however, not to be construed as limiting the invention.

COMPARATIVE EXAMPLES 1–3

The following comparative examples 1–3, were carried out to form gasket compositions containing an ascorbate oxygen scavenger in accordance to accepted methods, and thereafter tested.

The oxygen scavenging material was sodium ascorbate powder sold by BASF under Product No. 651281, possessing the following typical particle size distribution specifications:

95% through 120 U.S. standard sieve (125 microns)

90% through 200 U.S. standard sieve (75 microns)

70% through 400 U.S. standard sieve (38 microns).

Typical lots of Product No. 651281 contain approximately 5% (by weight) of particles larger than 125 microns based on sieve analysis testing.

The commercially available ascorbate powder was pre-dispersed in an epoxidized soybean oil plasticizer, such as the one disclosed by U.S. Pat. No. 5,106,886 to Hofeldt et al, at a ratio of 1:1 parts by weight and formed a paste/slurry which was then incorporated into the plastisol. The paste was prepared in a double planetary mixer to thoroughly wet and disperse powders into liquid while having a minimal effect on the particle size of the powders. The resulting paste was tested with a Fineness-of-Grind Gage, commonly known as a Hegman Gage. The Fineness-of-Grind Gage operates by screening out particles in the paste as it is drawn with a straightedge scraper through a precisely machined graduated trough. In the paste prepared from the commercially available (i.e., non-milled) sodium ascorbate, about 5 percent of particles having dimensions greater than 125 microns (0.005 inches) were found.

COMPARATIVE EXAMPLE 1

A plastisol composition containing a 1:1 paste of commercially purchased sodium ascorbate in epoxidized soybean oil was prepared using the pre-dispersion method above mentioned.

The components of the PVC plastisol formulation were weighed separately and introduced into a conventional single-planetary plastisol mixer where they were mixed in a conventional manner. It will readily be recognized by those skilled in the art that other mixing equipment such as double-planetary mixer, sigma-blade mixer, conical (Nauta) mixer, or high-speed disperser mixer may also be employed. These mixers employ a vessel into which the separate raw material components are combined. The sodium ascorbate paste (1:1) which was prepared as described above, was then added to the mixer.

At this point, all the raw material ingredients in the formulation have been added to the mixing vessel. The mixing blades were then operated at high speed generally for a period of 15–60 minutes to assure a thoroughly mixed batch. Often during this last step, vacuum, typically 27–29 inches Hg, is applied to the mixing vessel to remove air (deaerate the compound), in which case the deaeration time is usually 45–75 minutes or until all air was removed. Those skilled in the art will recognize that various changes and modifications can be made to the foregoing mixing procedure without significantly changing the final mixed plastisol.

The resulting plastisol was then lined, molded and fused in 48 mm metal closures. These closures were subsequently steam-vacuum sealed on glass containers packed with foodstuffs in a commercial food packing facility. Sealed packages were then submitted for accelerated oxygen permeation testing in which they were placed into a hermetic chamber filled with pressurized oxygen gas at 20 psig and held in a temperature range of 20–30° C.

The resulting plastisol successfully prevented oxygen from reacting with the packed foodstuff. However, during the first year of package shelf life, approximately 10 percent of the gaskets failed. Here, the mode of failure is loss of hermetic seal resulting in zero package vacuum, thereby leading to food spoilage.

COMPARATIVE EXAMPLE 2

Example 2 was formulated in a manner identical to Example 1, except that the formed paste contains the commercially purchased sodium ascorbate dispersed in epoxidized soybean oil plasticizer at a ratio of 3:1 parts by weight. When tested in metal closures as described above, the results also indicate approximately 10 percent of the sealed packages exhibited loss of hermetic seal during the first year of package shelf life, thereby leading to food spoilage.

COMPARATIVE EXAMPLE 3

Example 3 was performed by preparing the plastisol, wherein the polyvinyl chloride resin along with the conventional additives as described in Example 1, were dispersed in an epoxidized soybean oil plasticizer, but without any oxygen scavenger. The plastisol was then lined, molded, and fused in metal closures and tested as described above. The tests conducted indicated that these gaskets did not prevent discoloration caused by oxidation of the foodstuff surface. However, the gaskets demonstrated normal hermetic seal properties, with package vacuum levels maintained at approximately 20 inches of mercury over the 2-year shelf life of the package.

Sealants prepared with commercially available ascorbate oxygen scavenger particles have been found to undergo metamorphosis over a period of time primarily due to oxidation and exposure to water near the surface of the sealant. The change in shape of the particles leads to leakage of air into the package (i.e. loss of hermetic seal) causing the catastrophic spoilage of the packaged foodstuff.

Microscopic examination of the gaskets which lost hermetic seal revealed that coarse (125 microns or greater) sodium ascorbate particles near the surface of the gasket had changed shape by either swelling, shrinking, partial dissolution or other mechanisms.

The change in shape of coarse sodium ascorbate particles caused small imperfections in the gasket surface at the boundary between the glass container gasket lip and the gasket surface. Upon its initial contact with the glass container during steam-vacuum sealing and subsequent thermal processing of the package (e.g. sterilization), the surface is molded around and thereby intimately mated with to the glass container sealing lip. Hence, the small imperfections of the gasket surface caused by the change in shape of the coarse sodium ascorbate particles resulted in formation of leak paths at the boundary between the glass and the glass container. These paths allowed air to enter the package, causing loss of the package's hermetic seal (e.g. the package had zero vacuum), causing catastrophic spoilage of the packaged foodstuff.

Given the failure mode of the sodium ascorbate containing plastisol formulations prepared as described above, it became apparent that eliminating coarse sodium ascorbate particles from the plastisol was necessary to eliminate the loss of hermetic seal.

EXAMPLES 4–5

The procedure utilized in this series of experiments was essentially the same as the technique described in Examples 1 and 2, except that the plasticizer paste containing the ascorbate was processed by milling in a ball mill prior to incorporation of the paste into the plastisol. Those skilled in the art will recognize that other well known methods of particle size reduction, such as milling in a pebble mill, crushing, impact-milling, three-roll milling and jet milling are equally effective in achieving the benefits of this invention.

As the paste is milled, the following data was obtained using the Fineness-of-Grind Gage Test, as described above:

| TIME IN BALL MILL (HOURS) | LARGEST PARTICLE SIZE IN PASTE (INCHES) |
| --- | --- |
| 24 | 0.0030 (76.20 microns) |
| 48 | 0.0025 (63.50 microns) |
| 72 | 0.0022 (55.88 microns) |
| 96 | 0.0020 (50.80 microns) |

Ball Mill Speed 86 rpm
Mill Jar Realox #1 Size Jar
Cylindrical Grinding Media 13/16 x 13/16 inches (150 per jar)

A plastisol containing paste of commercially available sodium ascorbate in epoxidized soybean oil was milled for 96 hours as described above and then lined, molded, and fused in 48 mm metal closures. The sodium ascorbate of the paste was fabricated such that at least about 99.5 percent of the particles are less than 125 microns, preferably less than 76.2 microns, more preferably less than 63.5 microns, yet more preferably less than 55.88 microns, and most preferably less than 50.8 microns. Even more desirably, at least about 99.9 of the particles are less than 125 microns, and at least about 97 percent of the particles are less than 76.20 microns and at least 95 percent of the particles are less than 63.5 microns. Furthermore, it is preferred that substantially all of the particles are less than about 76.2 microns.

Samples of these closures were subsequently steam vacuum sealed on glass containers packed with an oxygen-sensitive foodstuff in a commercial food packing facility. The sealed packages were then submitted for accelerated oxygen permeation testing in which they are placed in a hermetic chamber filled with pressurized oxygen gas at 20 psig and held in a temperature range of 20–30° C.

Accelerated Oxygen Permeation Test Results—4 Weeks

Storage conditions: commercially purified oxygen pressurized @ 20 psig

Storage duration: 4 weeks

Storage temperature: 20–30° C.

Container: 48 mm glass container, 2.5-ounce capacity

Closure: 48 mm metal PT

Product: sterilized strained meat

| PLASTISOL FORMULATION | LEVEL OF SODIUM ASCORBATE, PHR | 1:1 SLURRY* MILLING TIME (HRS.) | AVERAGE SURFACE COLOR RATING** |
|---|---|---|---|
| AH-10983 | 7.5 | 96 | 0.25 |
| AH-10982 | 5 | 96 | 0.14 |
| AH-10923 | 7.5 | 0 | 0.29 |
| CONTROL | 0 | N/A | 3.9 |

*1:1 Epoxidized Soybean Oil:Sodium Ascorbate, by weight
**0 = excellent (no color change)
4 = Poor (extreme color change from red to green)

Accelerated Oxygen Permeation Test Results—8 Weeks

Storage conditions: commercially purified oxygen pressurized @ 20 psig

Storage duration: 8 weeks

Storage temperature: 20–30° C.

Container: 48 mm glass container, 2.5-ounce capacity

Closure: 48 mm metal PT

Product: sterilized strained meat

| PLASTISOL FORMULATION | LEVEL OF SODIUM ASCORBATE, PHR | 1:1 SLURRY* MILLING TIME (HRS.) | AVERAGE SURFACE COLOR RATING** |
|---|---|---|---|
| AH-10983 | 7.5 | 96 | 0.5 |
| AH-10982 | 5 | 96 | 0.1 |
| AH-10923 | 7.5 | 0 | 1.0 |
| CONTROL | 0 | N/A | 3.9 |

*1:1 Epoxidized Soybean Oil:Sodium Ascorbate, by weight
**0 = excellent (no color change)
4 = Poor (extreme color change from red to green)

Ambient Storage Test Results—2 Years

Storage conditions: ambient atmospheric air

Storage duration: 2 years

Storage temperature: 20–30° C.

Container: 48 mm glass container, 2.5-ounce capacity

Closure: 48 mm metal PT

Product: sterilized strained meat

| PLASTISOL FORMULATION | LEVEL OF SODIUM ASCORBATE, PHR | 1:1 SLURRY* MILLING TIME (HRS.) | AVERAGE SURFACE COLOR RATING** | NIL VACUUM PACKAGES*** (%) |
|---|---|---|---|---|
| AH-10983 | 7.5 | 96 | 1.0 | 0 |
| AH-10982 | 5 | 96 | 2.0 | 0 |
| AH-10923 | 7.5 | 0 | 3.0 | 10 |
| CONTROL | 0 | N/A | 4.0 | 0 |

*1:1 Epoxidized Soybean Oil:Sodium Ascorbate, by weight
**0 = excellent (no color change)
4 = poor (extreme color change from red to green)
***Percentage of packages which lost vacuum (complete loss of hermetic seal)

The results demonstrate that gaskets containing sodium ascorbate exhibited excellent preservation of the color of the foodstuff surface, indicating the sodium ascorbate containing gaskets have successfully prevented oxygen from reacting with the packaged foodstuffs. Gaskets containing ball-milled sodium ascorbate preserve the color of the foodstuff surface to a greater degree than gaskets containing standard particle size distribution of the commercially available sodium ascorbate powder described above. Moreover, none of the packages containing the ball-milled sodium ascorbate lost vacuum over a two year shelf life, while about 10% of the packages containing standard particle size distribution of the commercially available powder, as described above, lost vacuum.

EXAMPLE 6

To further test the improvement in oxygen scavenging efficiency provided by this invention, the following oxygen uptake analysis was conducted using a commercially available plastisol gasket*** containing oxygen-scavenging materials:

| GASKET DESCRIPTION | GASKET WEIGHT (G) | STOICHIOMETRIC CAPACITY** OF GASKET TO REACT WITH OXYGEN (MICROGRAMS) | OXYGEN UPTAKE BY GASKET (MICROGRAMS OXYGEN) | |
|---|---|---|---|---|
| | | | 1-day | 2-days |
| Test 001* | 1.08 | 3796 | 1440 | 2190 |
| Test 002* | 0.83 | 5835 | 1750 | 2550 |
| Grace CAP 25290-C-1 Commercial Gasket*** | 1.13 | 5650 | 891 | 1470 |

* The tests performed were on plastisol composition gaskets wherein the sodium ascorbate paste had been ball-milled for 96 hours.
**Stoichiometric Capacity refers to the theoretical amount of oxygen which will react with the scavenger ingredient(s) in the gasket if all of the scavenger reacts with the oxygen, and the reaction goes to completion.
***The sodium ascorbate contained in the plastisol composition had not been milled.

These tests were performed by placing each gasket into a glass vial, placing a moist wick in each vial. Thereafter, gas samples from the vial were withdrawn with a gas syringe at time intervals of 0, 1-day, 2-days, and then analyzed by chromatography to determine the amount of oxygen absorbed by each gasket.

The test results provide quantitative evidence that sodium ascorbate, having its particle size reduced as described above and then added to the plastisol formulation, absorbs oxygen more efficiently than commercially available oxygen-scavenging gasket, even when the stoichiometric capacity of the commercially available gasket is higher than that of gaskets with reduced particle size. By providing a larger surface area, the reduced particle size sodium ascorbate is more readily available to react with oxygen as it is permeating through the gasket.

The benefits of this invention can also be realized by following the procedure outlined in Examples 4 and 5, wherein the sodium ascorbate is first ground into a fine powder, having the dimensions outlined above, and immediately dispersed into epoxidized soybean oil to avoid oxidation of the particles prior to dispersion into the plasticizer. In addition, the preparation of a gasket can be achieved by grinding the oxygen scavenger particles in a fine powder under an inert atmosphere prior to introducing them into the formulation.

While the invention has been described in detail with reference to specific embodiments thereof, it will be apparent to one skilled in the art that various changes and modifications can be make, and equivalents employed, without departing from the scope of the appended claims.

What is claimed is:

1. A method of making an oxygen scavenging sealant composition, comprising:
    pre-dispersing oxygen scavenger particles in a plasticizer to form a paste;
    processing said paste to the point where at least about 99.5 percent by weight of said oxygen scavenger particles are less than 125 microns in size; and
    introducing said processed paste into a plastisol formulation.

2. The method according to claim 1, wherein said oxygen scavenger is selected from the group consisting of ascorbates, isoascorbates, and a blend of ascorbates and sulphites.

3. The method according to claim 1, wherein at least about 99.5 percent by weight of said oxygen scavenging particles are less than 76.2 microns in size.

4. The method according to claim 1, wherein said plastisol containing said paste therein, is exposed to a temperature in a range of 200–215° C. to form a deformable solid.

5. The method according to claim 1, wherein said oxygen scavenger is sodium ascorbate pre-dispersed at a ratio of 1:1 parts by weight to said plasticizer.

6. The method according to claim 5, wherein said plasticizer is an epoxidized soybean oil.

7. The method according to claim 1, wherein 99.9 percent by weight of said oxygen scavenging particles are less than 125 microns in size.

8. The method according to claim 7, wherein at least about 95 percent by weight of said oxygen scavenging particles are less than 63.5 microns in size.

9. A method of making an oxygen scavenging sealant composition, comprising:
    pre-dispersing oxygen scavenger particles in a plasticizer to form a paste;
    processing said paste to the point where at least 99.5 percent by weight of said oxygen scavenger particles are less than about 55.88 microns in size;
    introducing said processed paste into a plastisol formulation.

10. A method of making an oxygen scavenging composition for a closure, comprising:
    pre-dispersing oxygen scavenging particles in a liquid carrier;
    processing said carrier comprising said particles therein to the point where substantially all of the particles are less than about 76.20 microns in size; and
    adding said carrier component to a polymeric matrix to form said composition.

11. A method in accordance with claim 10, wherein said composition is a gasket composition.

12. A method in accordance with claim 10, wherein said carrier is a plasticizer, and said polymeric material is a plastisol.

13. A method in accordance with claim 10, wherein said plastisol is polyvinyl chloride or a copolymer thereof.

* * * * *